United States Patent [19]

Vaughn, Jr. et al.

[11] 4,414,349
[45] Nov. 8, 1983

[54] SILICONE RESIN COATING COMPOSITION ADAPTED FOR PRIMERLESS ADHESION TO PLASTIC SUBSTRATES AND PROCESS FOR MAKING SAME

[75] Inventors: Howard A. Vaughn, Jr.; Ta-Yen Ching, both of Schenectady, N.Y.

[73] Assignee: General Electric Company, Waterford, N.Y.

[21] Appl. No.: 339,475

[22] Filed: Jan. 15, 1982

[51] Int. Cl.$^3$ .................................................. C09D 3/82
[52] U.S. Cl. .............................. 524/261; 106/287.13; 524/588; 524/730
[58] Field of Search .............. 106/287.13; 204/159.13; 524/261, 588, 730

[56] References Cited

U.S. PATENT DOCUMENTS

| | | | |
|---|---|---|---|
| 3,708,225 | 1/1973 | Misch et al. | 351/160 |
| 3,976,497 | 8/1976 | Clark | 106/287 SE |
| 3,986,997 | 10/1976 | Clark | 428/412 |
| 4,027,073 | 5/1977 | Clark | 428/412 |
| 4,154,617 | 5/1979 | Keithler | 106/287.13 |
| 4,159,206 | 6/1979 | Armbruster et al. | 106/287.13 |
| 4,177,315 | 12/1979 | Ubersax | 428/336 |
| 4,188,451 | 2/1980 | Humphrey, Jr. | 428/331 |
| 4,277,287 | 7/1981 | Frye | 106/287.12 |
| 4,278,804 | 7/1981 | Ashby et al. | 106/287.13 |
| 4,299,746 | 11/1981 | Frye | 524/266 |
| 4,313,979 | 2/1982 | Frye et al. | 106/287.13 |
| 4,324,712 | 4/1982 | Vaughn | 106/287.13 |

Primary Examiner—Ronald W. Griffin
Attorney, Agent, or Firm—Hedman, Casella, Gibson, Costigan and Hoare

[57] ABSTRACT

This invention relates to coating compositions prepared by prehydrolyzing the silane function of a silylated ultraviolet radiation screening compound and adding it to an aqueous silicone resin composition. Hydrolyzing the silane function renders the ultraviolet screen a silanol which is a compatible component in the silicone resin compositions contemplated.

39 Claims, No Drawings

SILICONE RESIN COATING COMPOSITION ADAPTED FOR PRIMERLESS ADHESION TO PLASTIC SUBSTRATES AND PROCESS FOR MAKING SAME

BACKGROUND OF THE INVENTION

This invention relates to improved protective silicone resin coating compositions. More particularly, it relates to a silicone resin coating composition containing a silylated ultraviolet radiation screening agent (UV screen) which will adhere readily to unprimed plastic substrates to form a tough, abrasion-resistant coating thereon.

Recently, the substitution of glass with transparent materials which do not shatter, or are more resistant to shattering than glass, has become widespread. For example, transparent glazing made from synthetic organic polymers is now utilized in public transportation vehicles such as trains, buses, taxis and airplanes. Lenses for eye glasses and other optical instruments, as well as glazing for large buildings, also employ shatter-resistant, transparent plastics. The lighter weight of these plastics in comparison to glass is a further advantage, especially in the transportation industry where the weight of the vehicle is a major factor in fuel economy.

While transparent plastics provide a major advantage of being more resistant to shattering than glass, a serious drawback lies in the ease with which these plastics mar and scratch due to everyday contact with abrasives, dust and cleaning equipment, and ordinary weathering. Continuous scratching and marring results in imparied visibility and poor aesthetics, and often requires replacement of the glazing or lens or the like.

One of the most promising and widely used transparent plastics for glazing is polycarbonate, such as that known as LEXAN®, sold by General Electric Company. It is a tough material, having high impact strength, high heat deflection temperature and good dimensional stability. It is also self-extinguishing, and easily fabricated. Acrylics, such as polymethylmethacrylates, are also widely used glazing and lens materials.

Attempts have been made to improve the abrasion resistance of these transparent plastics. For example, scratch-resistant coatings formed from mixtures of silica, such as colloidal silica or silica gel, and hydrolyzable silanes in a hydrolysis medium, such as alcohol and water, are known. Misch, et al., U.S. Pat. No. 3,708,225; Clark, U.S. Pat. No. 3,986,977; 3,976,497 and 4,027,073; Armbruster, et al., U.S. Pat. No. 4,159,206; and Ubersax, U.S. Pat. No. 4,177,315, for example, describe such compositions. Improved such compositions are also described in commonly assigned copending U.S. application Ser. No. 964,910, filed Nov. 30, 1978, and Frye, U.S. Pat. No. 4,277,287.

It has been discovered that such polysilicic acid coatings, especially if acidic, fail to adhere to certain plastic substrates, such as polycarbonate, and, even if prepared on the basic side of neutrality, they may adhere initially but peel after brief light aging. In copending application Ser. No. 91,716, filed Nov. 6, 1979, now U.S. Pat. No. 4,299,746, issued Nov. 10, 1981, the addition of an ultraviolet (UV) light absorbing agent, such as 2,4-dihydroxybenzophenone, is suggested, but in some cases this may have a plasticizing effect, and polycarbonate seems to have a tendency to reject the coating on severe exposure. Another approach is to use a primer coat which adheres to both the silicone resin coating and the polycarbonate substrate, and which also serves as a binder for high levels of UV absorbers. The silicone resin coating is put on as a second coat over the primer coat. See, for example, Humphrey, Jr., U.S. Pat. No. 4,188,451, and Frye, U.S. Pat. No. 4,277,287.

To avoid the need for a primer coat, commonly assigned copending U.S. application Ser. No. 34,164, filed Apr. 27, 1979 now abandoned, suggests replacing the usual solvents, e.g., isobutanol, with a more aggressive solvent, e.g., an ester, a ketone, a nitroparaffin, or the like. However, these are expensive and generally might require process modifications.

Other approaches to the elimination of primers from the application of silicone coatings to plastic are described in commonly assigned copending U.S. application Ser. Nos. 326,197, filed Dec. 1, 1981, and 154,624, filed May 30, 1980, now U.S. Pat. No. 4,373,061, issued Feb. 8, 1983. The former describes shock curing at elevated temperatures of a silicone resin coating to yield an adherent coating without the use of primers. The latter application discloses that incorporation of a silylated UV screening compound into the silicone resin admits to primerless adhesion to plastic.

There are, however, drawbacks to these approaches: High temperature curing is performed in a temperature range (about 140° C. to 150° C.) which may distort or warp a plastic substrate, may cause total adhesion failure instead of promoting it, or may volatilize certain beneficial additives (such as those described in the above-mentioned U.S. application Ser. No. 91,716). The use in silicone resin coatings of silylated UV screens, such as 4-(3-triethoxysilylpropoxy)-2-hydroxybenzophenone (SHBP) and the like, requires a lengthy aging period, delaying the time the coating composition is usable for a week or longer.

The above-mentioned patents and applications are incorporated herein by reference.

SUMMARY OF THE INVENTION

It has now been discovered that the extended service life and increased resistance to discoloration gained by using silylated UV screens in silicone coatings can be achieved without the disadvantageous high-temperature curing or protracted aging periods associated with known methods, by prehydrolyzing the silane function of a silylated UV screen to a silanol. The hydrolyzed UV screen can be added directly to a prepared silicone resin coating composition and applied to plastic substrates without delay to form, after curing, a tough, mar-resistant, optically clear coating thereon.

Accordingly, it is the object of this invention to provide improved silicone resin coating compositions.

It is a further object of this invention to provide silicone resin coating compositions which will adhere readily to plastic substrates without the use of primers.

It is a further object of this invention to provide a silicone resin coating with increased resistance to discoloration.

It is a further object of this invention to provide a silicone resin coating containing a silylated UV screen which is ready to use when prepared, and does not require a long aging period.

It is a further object of this invention to provide a process for prehydrolyzing silylated UV screening compounds, and incorporating them into silicone resin coatings.

These and other objects are accomplished herein by providing a silicone resin coating composition prepared as follows:

A silicone resin coating composition adapted for primerless adhesion to plastic substrates prepared by:
(i) reacting a silylated ultraviolet radiation screening compound with a mixture comprising alcohol, water, and a small amount of an agent to catalyze hydrolysis; and thereafter
(ii) adding the reaction product to an aqueous partially condensed silicone resin composition containing colloidal silica.

DETAILED DESCRIPTION OF THE INVENTION

The coating composition of this invention is prepared by prehydrolyzing the silane function of a silylated ultraviolet radiation screening compound and adding it to an aqueous silicone resin composition. Hydrolyzing the silane function renders the ultraviolet screen a silanol which is a compatible component in the silicone resin compositions contemplated herein. In the silanol form, the ultraviolet screens of this invention are readily incorporated into the silicone resins to form servicable coating compositions that can be used immediately, without special curing, priming or aging steps.

The silylated UV screens used in accordance with the present invention must be soluble in, and otherwise compatible with, aqueous partially condensed silicone resin compositions containing colloidal silica of the type described hereinafter.

Silylated UV screens suitable for this invention have the general formula

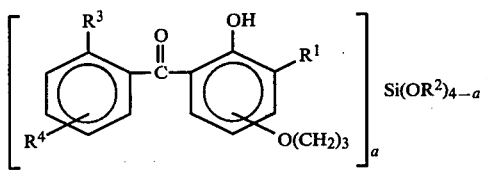

wherein $R^1$ is hydrogen, $C_1$–$C_8$ alkyl or halogen; $R^3$ and $R^4$ are hydrogen, $C_1$–$C_8$ alkoxy, carboxy, halogen, hydroxy, amino, carbethoxy or —Q—$(CH_2)_3Si(OR^2)_3$; Q is —NH— or —O—; $R^2$ is $C_1$–$C_8$ alkyl; and a is an integer equal to 1-3 inclusive. These compounds can be made following the description in U.S. Pat. No. 4,278,804 (Ashby et al.), which is incorporated herein by reference. 4-(3-triethoxysilylpropoxy)-2-hydroxybenzophenone is preferred.

Once hydrolyzed and mixed with the silicone resin, it is believed that the silylated UV screens copolymerize into the silicone, as is suggested by their low volatility upon curing and continuous heating. The UV compounds used in the present invention are particularly effective in protecting polycarbonate from discoloration.

Any amount of silylated UV screen which is effective to prevent discoloration of the substrate to which the composition will be applied can be used herein. In general, it has been found that best results are obtained if the prehydrolyzed UV screen is employed in amounts from 7 to 18 weight percent of the total solids of the final coating composition.

In the practice of the invention the silylated UV screen is hydrolyzed by adding it to a reaction medium containing alcohol, water and a small amount of an agent which will catalyze the hydrolysis, usually an acid. The mixture is stirred constantly and allowed to react for about 12 to 48 hours. Although a wide range of pH is contemplated, it has been found that the rate of hydrolysis of the silylated UV screens is faster in both acidic and basic than in neutral media, with acidic pH having the greater effect. Consequently, adjusting pH by varying the amount of acid in the system will allow more flexibility with hydrolysis reaction time.

No optimum relative proportion of reactants has been found, but generally about 10 parts by weight of silylated UV screen are added to a mixture of 10 to 20 parts by weight alcohol, 1.5 to 3.0 parts by weight water, and 0.01 to 0.02 parts by weight of the hydrolysis catalyst.

Suitable alcohols for the purpose of this invention include methanol, ethanol, propanol, n-butyl alcohol, t-butyl alcohol, isobutanol, etc. Isobutanol and isopropanol are preferred. Mixtures of such alcohols can be used as well.

Suitable hydrolysis-catalyzing agents for use in this invention include acetic acid, propionic acid, oxalic acid, hydrochloric acid, sulphuric acid, etc. Acetic acid is preferred.

The mixture may additionally contain other solvents, up to about 65 weight percent of the mixture prior to the addition of the silylated UV screen. Suitable such solvents include aceton, diacetone alcohol butyl CELLOSOLVE ®, and the like.

The silicone resin compositions suitable for this invention are any of the polysilicic acid coatings well-known in this art. Such compositions include those described in the aforementioned patents, U.S. Pat. No. 3,986,997 and U.S. Pat. No. 4,027,073 (Clark); U.S. Pat. No. 4,177,315 (Ubersax); U.S. Pat. No. 4,277,287 (Frye); U.S. Pat. No. 4,159,206 (Armbruster, et al.); and U.S. application Ser. No. 964,910. These patents and application are incorporated herein by reference.

In the practice of the present invention, the silicone resin compositions are best prepared by hydrolyzing a trialkoxysilane, or a mixture of trialkoxysilanes, of the formula $RSi(OR')_3$, wherein R is alkyl of from 1 to 3 carbon atoms or aryl, and R' is alkyl, in an aqueous dispersion of colloidal silica.

Preferred aqueous colloidal silica dispersions generally have a particle size of from 5 to 150 millimicrons in diameter. Colloidal silicas having an average particle size of from 10 to 30 millimicrons are most preferred. These silica dispersions are well known in the art and commercially available ones include, for example, those sold under the trademarks of LUDOX ® (duPont) and NALCOAG ® (Nalco Chemical Co.). Particularly preferred for the purposes herein is a product known as LUDOX LS ® (duPont). Such colloidal silicas are available as both acidic and basic hydrosols.

In accordance with this invention, the aqueous colloidal silica dispersion is added to a solution of a small amount of alkyltriacetoxysilane in alkyltrialkoxysilane or aryltrialkoxysilane. For the purposes herein, from about 0.07 parts by weight to about 0.1 parts by weight, based on 100 parts by weight of the total composition, of the alkyltriacetoxysilane is used. The temperature of the reaction mixture is maintained at about 20° C. to about 40° C., preferably 20° C. to about 30° C., and most preferably below 25° C. It has been found that in about six to eight hours sufficient trialkoxysilane has hydrolyzed so as to reduce the initial two-phase liquid mixture to one liquid phase in which the now treated silica (i.e., treated by admixture with trialkoxy silane) is dispersed. In general, the hydrolysis reaction is allowed to continue for a total of about 24 to 48 hours, depending upon the desired viscosity of the final product. The more time the hydrolysis reaction is permitted to continue, the higher will be the viscosity of the product. After the hydrolysis has been completed to the desired extent, the solids content is adjusted by the addition of alcohol, preferably isobutanol, to the reaction mixture. Other suitable alcohols for the purposes herein include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butyl cellosolve and the like in minor amounts, like no more than 20 weight percent of the cosolvent system can also be used. The solids content of the coating compositions of this invention is generally preferred to be in the range of from about 18 to 25%, most preferably, about 20%, by weight of the total composition. The pH of the resultant coating composition is in the range of from about 7.1 to about 7.8, preferably higher than 7.2 If necessary, dilute base, such as ammonium hydroxide or weak acid, such as acetic acid, can be added to the composition to adjust the final pH to this desired range. At these basic pH's, the compositions are translucent liquids which are stable at room temperatures. Below about 5° C. (40° F.) the period of stability is increased further.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic and the like. Alkyltriacetoxysilanes wherein the alkyl group contains from 1 to 6 carbon atoms can be used, alkyl groups having from 1 to 3 carbon atoms being preferred. Methyltriacetoxysilane is the most preferred alkyltriacetoxysilane.

The silanetriols, $RSi(OH)_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least, a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

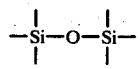

bonding occurs. This condensation takes place over a period of time and is not an exhaustive condensation, rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion of all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monoethylsilanetriol) in preparing the coating compositions herein. In the preferred coating compositions herein the partial condensate is present in an amount of from about 55 to 75 weight percent of the total solids in a solvent of alcohol and water, the alcohol comprising from about 50 to 95 weight percent of the cosolvent.

Coating compositions according to this invention are formed by adding the prehydrolyzed UV screen to the silicone resin composition. The coating composition may then be applied directly to a plastic substrate by conventional methods, such as flowing or dipping, to form a continuous surface film.

Substrates especially contemplated herein are transparent and non-transparent plastics. More particularly, these plastics are synthetic organic polymeric substrates such as acrylic polymers, like poly(methylmethacrylate); polyesters, such as poly(ethyleneterephthalate), poly(butylene terephthalate), etc.; polyamides; polyimides; acrylonitrile-styrene copolymers; styrene-acrylanitrile butadiene copolymers; polyvinyl chloride; butyrates; polyethylene and the like. As noted above, the coating compositions of this invention are especially useful as coatings for polycarbonates, such as those known as LEXAN ®, sold by General Electric Company.

The coating compositions prepared according to the present invention will adhere to plastic substrates without the use of primers. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane $(RSiO_{3/2})$. In the finished cured coating the ratio of $RSiO_{3/2}$ units to $SiO_2$ will range from about 0.43 to about 9.0, preferably 1 to 3. A cured coating having a ratio of $RSiO_{3/2}$ to $SiO_2$, when R is methyl, of 2 is most preferred. The coating thickness can be varied by means of the particular application technique, but coatings of about 0.5 to 20 microns, preferably 2-10 microns, thickness are generally utilized.

The coating compositions of this invention will cure on a substrate at temperatures of, for example, 125° C. without the aid of an added curing catalyst. If one wishes to employ more desirable milder curing conditions, and/or decrease the cure time, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated *in situ* during the hydrolysis reaction herein.

The amount of curing catalyst can be varied within a wide range, depending upon the desired curing conditions. However, in general, catalyst in the amount of from about 0.05 to about 0.5 weight percent, preferably about 0.1 weight percent, of the composition can be used. Compositions containing catalysts in these amounts can be cured on a solid substrate in a relatively short time at temperatures in the range of from about 75° C.–150° C. to provide a transparent abrasion-resistant surface coating.

Many other additives may be added to the coating compositions described herein to lend specific desirable properties to the resultant coatings. These include flow control agents, such as the polysiloxane polyether copolymers of U.S. Pat. No. 4,277,287 (Frye), thickening agents, and others.

In order that those skilled in the art may better understand how to practice the present invention, the following examples are given by way of illustration and not by way of limitation.

EXAMPLES 1 AND 2

A stock aqueous silicone resin is prepared as follows:

22.1 parts by weight of LUDOX LS ®, silica sol (aqueous dispersion of colloidal silica, average particle size 12 millimicrons, pH 8.2, sold by duPont) is added to a solution of 0.1 parts by weight of methyltriacetoxysilane in 26.8 parts by weight of methyltrimethoxysilane. The temperature of the reaction mixture is maintained at 25° C. The hydrolysis is allowed to continue for about 24 hours. The solids content of the resultant reactant mixture is about 40.6% and is diluted to about 20% solids with the addition of isobutanol. 0.8 part by weight (4% of solids) of SF-1066 (polysiloxane polyether copolymer, sold by General Electric) is thoroughly mixed with 99 parts by weight of the resultant composition. The final composition has a pH of 7.3.

A silylated UV screen, 4-(3-triethoxysilylpropoxy)-2-hydroxybenzophenone (SHBP), is prehydrolyzed as follows:

10.0 parts by weight SHBP is added to a mixture of 15.0 parts by weight isopropanol and 3.0 parts by weight water. To this solution is added 0.01 parts by weight acetic acid. The solution is stirred for 24 hours.

Two coating compositions are prepared by mixing 13.4 and 20.0 parts by weight, respectively, of the prehydrolyzed solution with 300 parts by weight each of the stock resin. Each coating composition is flow coated on unprimed LEXAN ® panels, allowed to dry for ½ hour and cured 1 hour at 120° C.

Adhesion of the coating compositions to the panels is tested by the scribed adhesion method, whereby a crisscross pattern of 100-1 mm × 1 mm squares is scribed on the coated surface and 3M 710 tape is applied to the scribed surface and pulled away. A cured resin passes scribed adhesion if after three pieces of tape are applied and pulled away none of the coating has come off.

Both of the coatings pass the scribed adhesion test.

EXAMPLES 3 and 4

A solution of 10.0 parts by weight SHBP, 3.0 parts by weight water and 0.01 part by weight acetic acid is stirred eight hours and allowed to stand an additional 64 hours. It is then blended with 312.5 parts by weight of the stock resin.

Part of the resulting composition is flow coated on Lexan ® plaques, dried ½ hour and cured 1 hour at 120° C. These plaques pass the scribed adhesion test.

The remainder of the above composition is allowed to stand 24 hours. It is then coated on Lexan ® plaques and tested for scribed adhesion and also abrasion resistance.

Abrasion resistance is tested by measuring the haze (Δ%H) after 500 cycles on a Taber Abraser using a 500-gram load and CS-10F wheels. A Δ%H value less than 10 generally indicates good abrasion resistance.

The plaques coated with the 24-hour coating composition pass scribed adhesion and have a Δ%H$_{500}$ of 6.1.

EXAMPLES 5, 6, 7 and 8

Two SHBP pre-hydrolysis solutions are prepared with the following ingredients (all amounts are parts by weight):

|  | I | II |
|---|---|---|
| SHBP | 10.0 | 10.0 |
| isopropanol | 15.0 | 15.0 |
| water | 3.0 | 1.5 |
| acetic acid | 0.01 | 0.01 |

These are allowed to hydrolyze for 48 hours, then four coating compositions are made up (all amounts are parts by weight):

|  | 5 | 6 | 7 | 8 |
|---|---|---|---|---|
| stock resin | 300 | 300 | 150 | 150 |
| solution I | 13.4 | — | 10.0 | — |
| solution II | — | 13.4 | — | 10.0 |
| % SHBP of solids | 8% | 8% | 12% | 12% |

The next day, the four compositions coated on Lexan ® plaques, dried ½ hour and cured 1 hour at 130° C. Scribed adhesion and abrasion resistance are measured as described above.

"QUV Life," which indicates the resistance to weathering of the coatings, is also tested, using a QUV Accelerated Weathering Tester. The plaques are subjected to continuous cycles of 8 hours of UV radiation at 60° C. and 4 hours condensation at 50° C. Scribed adhesion is tested periodically until adhesion fails, the QUV life being then recorded as the number of hours before adhesion failure. A QUV life exceeding 500 hours is considered good.

For panels coated with the aforementioned four coatings, the following results are observed:

| | Scribed Adhesion | Δ % H$_{500}$ | QUV Life |
|---|---|---|---|
| Coating 5 | pass | 3.0 | 601 hours |
| Coating 6 | pass | 4.15 | 601 hours |
| Coating 7 | pass | 3.1 | 764 hours |
| Coating 8 | pass | 2.75 | 764 hours |

COMPARATIVE EXAMPLES A, B and C

The following compositions are prepared using non-hydrolyzed SHBP (all amounts are parts by weight):

| | A | B | C |
|---|---|---|---|
| stock resin | 151.4 | 151.4 | 151.4 |
| SHBP | 4.8 | 3.6 | 2.4 |
| % SHBP of solids | 15.9% | 11.9% | 7.9% |

The compositions are aged six days at room temperature. Each is then applied to unprimed Lexan® plaques, air dried ½ hour and cured 1 hour at 120° C. None of the plaques pass scribed adhesion, and only coating C passes the much less rigorous unscribed adhesion test.

EXAMPLES 9, 10 and 11

To a mixture of 3.0 parts by weight isobutanol, 0.5 parts by weight water, 0.5 parts by weight butyl CELLUSOLVE® (2-butoxyethanol solvent, Union Carbide) and 0.03 parts by weight acetic acid, 2.4 parts by weight SHBP is added and stirred for 72 hours. Half of this solution is added to 38 parts by weight of the stock resin to give Coating No. 9 containing 15.8 weight percent SHBP. The other half is added to 25 parts by weight of the stock resin to give a Coating No. 10 containing 24.7 weight percent SHBP. A portion of Coating No. 9 is further diluted by an equal volume of the stock resin to give Coating No. 11 which contains 7.9 weight percent SHBP.

These coatings are applied to unprimed LEXAN® panels, dried ½ hour and cured at 125° C. for 1 hour. The following results are observed:

| Coating | Adhesion | Δ % H$_{300}$* | QUV Life |
|---|---|---|---|
| 9 | pass | 4.8 | >750 hours |
| 10 | pass | 5.0 | >750 hours |
| 11 | pass | 4.1 | >150 hours |

*Δ % H after 300 cycles of the abrasive wheels was measured.

By following the teachings of this invention, a variety of useful, tough and optically clear coatings can be made. Obviously, other compositions and variations of the present invention are possible in light of the foregoing disclosure. It is understood, however, that changes which may be made in the particular embodiments of this invention are within the full intended scope of the invention as defined by the appended claims.

We claim:

1. A coating composition adapted for adhesion to plastic substrates without a primer, said composition being prepared by:
    (i) prehydrolyzing a silylated ultraviolet radiation screening compound by reaction with a mixture comprising alcohol, water, and a small amount of an agent to catalyze hydrolysis; and thereafter
    (ii) adding the silanol-functional reaction product to an aqueous partially condensed silicone resin composition containing colloidal silica.

2. The coating composition prepared according to claim 1, wherein the alcohol is selected from a group consisting of isopropanol and isobutanol.

3. The coating composition prepared according to claim 2, wherein the alcohol is isopropanol.

4. The coating composition prepared according to claim 2, wherein the alcohol is isobutanol.

5. The coating composition prepared according to claim 1, wherein said agent to catalyze hydrolysis is an acid.

6. The coating composition prepared according to claim 5, wherein said acid is acetic acid.

7. The coating composition prepared according to claim 1, wherein the silylated ultraviolet radiation screening compound is 4-(3-triethoxysilylpropoxy)-2-hydroxybenzophenone.

8. The coating composition prepared according to claim 1, wherein said mixture in step (i) has an acidic pH.

9. A composition prepared according to claim 1, wherein the silicone resin composition of step (ii) is a dispersion of colloidal silica in an aqueous-organic solution of a silanol of the formula RSi(OH)$_3$, wherein R is selected from a group consisting of alkyl having 1 to 3 carbon atoms and aryl, wherein at least 70 weight percent of the silanol is CH$_3$Si(OH)$_3$, said resin containing 10 to 50 weight percent solids, said solids consisting of 10 to 70 weight percent colloidal silica and 30 to 90 weight percent of the partial condensate.

10. The composition prepared according to claim 9, wherein the pH of the silicone resin composition is in the range of 7.1 to 7.8.

11. The coating composition prepared according to claim 1, wherein said silylated ultraviolet radiation screening compound has the formula:

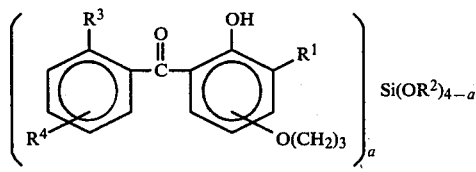

wherein R$^1$ is hydrogen, C$_1$-C$_8$ alkyl or halogen; R$^3$ and R$^4$ are hydrogen, C$_1$-C$_8$ alkoxy, carboxy, halogen, hydroxy, amino, carbethoxy or —Q—(CH$_2$)$_3$Si(OR$^2$)$_3$; Q is —NH— or —O—; R$^2$ is C$_1$-C$_8$ alkyl; and a is an integer equal to 1-3 inclusive.

12. The coating composition prepared according to claim 11, wherein R$^3$ is hydroxy.

13. The coating composition prepared according to claim 11, wherein R$^3$ is hydrogen.

14. The coating composition prepared according to claim 13, wherein R$^4$ is hydroxy.

15. A process for preparing a coating composition adapted for adhesion to plastic substrates without a primer, which comprises:
    (i) prehydrolyzing a silylated ultraviolet radiation screening compound by reaction with a mixture comprising alcohol, water, and a small amount of an agent to catalyze hydrolysis; and thereafter (ii) adding the silanol-functional reaction product to an aqueous partially condensed silicone resin composition containing colloidal silica.

16. The process of claim 15, wherein the alcohol is selected from a group consisting of isopropanol and isobutanol.

17. The process of claim 16, wherein the alcohol is isopropanol.

18. The process of claim 16, wherein the alcohol is isobutanol.

19. The process of claim 15, wherein said agent to catalyze hydrolysis is an acid.

20. The process of claim 19, wherein said acid is acetic acid.

21. The process of claim 15, wherein the silylated ultraviolet radiation screening compound is 4-(3-triethoxysilylpropoxy)-2-hydroxybenzophenone.

22. The process of claim 15, wherein said mixture in step (i) has an acidic pH.

23. The process of claim 15, wherein the silicone resin composition of step (ii) is a dispersion of colloidal silica in an aqueous-organic solution of a silanol of the formula $RSi(OH)_3$, wherein R is selected from a group consisting of alkyl having 1 to 3 carbon atoms and aryl, wherein at least 70 weight percent of the silanol is $CH_3Si(OH)_3$, said resin containing 10 to 50 weight percent solids, said solids consisting of 10 to 70 weight percent colloidal silica and 30 to 90 weight percent of the partial condensate.

24. The process of claim 23, wherein the pH of the silicone resin composition is in the range of 7.1 to 7.8.

25. The process of claim 15, wherein said silylated ultraviolet radiation screening compound has the formula:

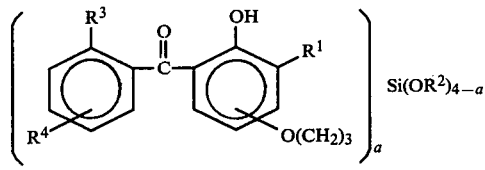

wherein $R^1$ is hydrogen, $C_1$–$C_8$ alkyl or halogen; $R^3$ and $R^4$ are hydrogen, $C_1$–$C_8$ alkoxy, carboxy, halogen, hydroxy, amino, carbethoxy or $—Q—(CH_2)_3Si(OR^2)_3$; Q is $—NH—$ or $—O—$; $R^2$ is $C_1$–$C_8$ alkyl; and a is an integer equal to 1-3 inclusive.

26. The process of claim 25, wherein $R^3$ is hydroxy.

27. The process of claim 25, wherein $R^3$ is hydrogen.

28. The process of claim 27, wherein $R^4$ is hydroxy.

29. An unprimed plastic substrate coated on at least one surface with a coating composition as defined in claim 1.

30. A plastic substrate as defined in claim 29, wherein said plastic substrate is composed of polycarbonate.

31. A coating composition adapted for adhesion to plastic substrates without a primer and without prior aging, said coating composition comprising an aqueous partially condensed silicone resin composition containing colloidal silica and copolymerized with a small amount, effective to prevent discoloration, of a soluble prehydrolyzed silanol-functional silylated ultraviolet radiation screening compound having the formula:

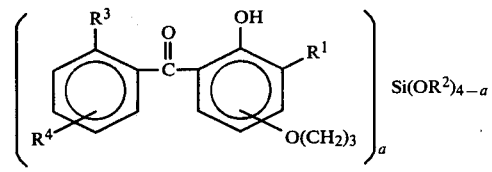

wherein $R^1$ is hydrogen, $C_1$–$C_8$ alkyl or halogen; $R^3$ and $R^4$ are hydrogen, $C_1$–$C_8$ alkoxy, carboxy, halogen, hydroxy, amino, carbethoxy or $—Q—(CH_2)_3Si(OR^2)_3$; Q is $—NH—$ or $—O—$; $R^2$ is $C_1$–$C_8$ alkyl; and a is an integer equal to 1-3, inclusive.

32. An unprimed plastic substrate coated on at least one surface with a mar-resistant, optically clear composition adapted for use without prior aging comprising an aqueous partially condensed silicone resin composition containing colloidal silica, said silicone resin composition being copolymerized with a small amount, effective to prevent discoloration, of a soluble prehydrolyzed silanol-functional silylated ultraviolet radiation screening compound having the formula:

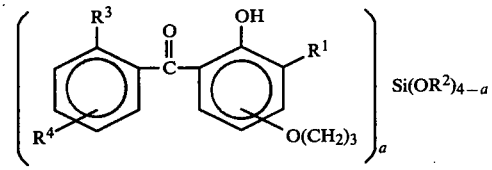

wherein $R^1$ is hydrogen, $C_1$–$C_8$ alkyl or halogen; $R^3$ and $R^4$ are hydrogen, $C_1$–$C_8$ alkoxy, carboxy, halogen, hydroxy, amino, carbethoxy or $—Q—(CH_2)_3Si(OR^2)_3$; Q is $—NH—$ or $—O—$; $R^2$ is $C_1$–$C_8$ alkyl; and a is an integer equal to 1-3, inclusive.

33. The coating composition of claim 31, wherein $R^3$ is OH.

34. The coating composition of claim 31, wherein $R^3$ is H.

35. The coating composition of claim 34, wherein $R^4$ is OH.

36. The coating composition of claim 31, wherein said silylated ultraviolet radiation screening compound is 4-(3-triethoxysilylpropoxy)-2-hydroxybenzophenone.

37. A coated substrate as defined in claim 32, wherein $R^3$ is OH.

38. A coated substrate as defined in claim 32, wherein $R^3$ is H.

39. A coated substrate as defined in claim 38, wherein $R^4$ is OH.

* * * * *